T. G. Hofer,

Vegetable Cutter.

No. 68877. Patented Sept. 17, 1867.

Witnesses:
Saml. S. Boyd
Henry T. Carter

Inventor:
T. G. Hofer

United States Patent Office.

T. G. HÖFER, OF SAINT LOUIS, MISSOURI.

Letters Patent No. 68,877, dated September 17, 1867.

---

IMPROVED VEGETABLE-SLICER AND GRATER.

---

The Schedule referred to in these Letters Patent and making part of the same.

---

TO ALL WHOM IT MAY CONCERN:

Be it known that I, T. G. HÖFER, of the city and county of Saint Louis, in the State of Missouri, have invented a new and useful improved Vegetable-Slicer and Grater, of which the following is a full, clear, and exact description, reference being had to the annexed drawing, making a part of this specification, in which—

Similar letters indicate like parts.

The object of my invention is to produce a combined vegetable-slicer and grater, with the knives of the former adjustable, so simple and cheap in construction, and easily operated, as to be suited for domestic purposes as well as for use on a large scale.

Figure 1:
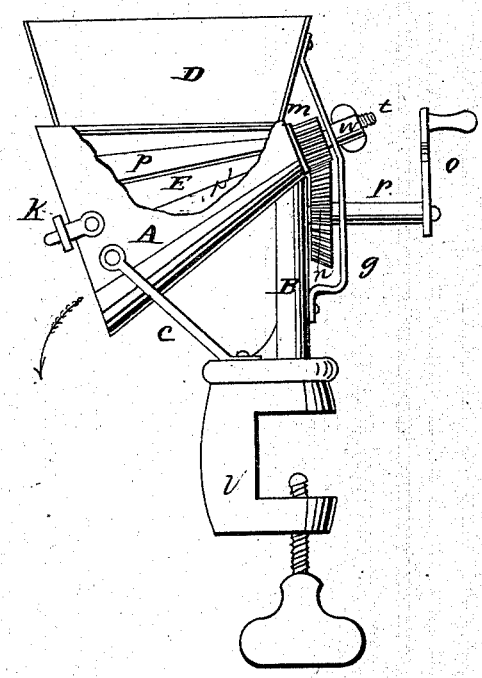
Figure 1 represents a side elevation of my invention with a portion of the outer cylinder removed, showing the knives.
Figure 2:
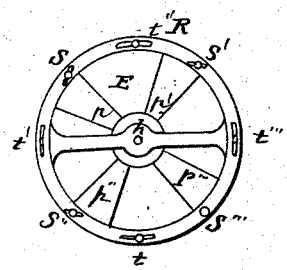
Figure 2 represents a front view of the inner cylinder, showing the arrangement of the knives.
Figure 3:
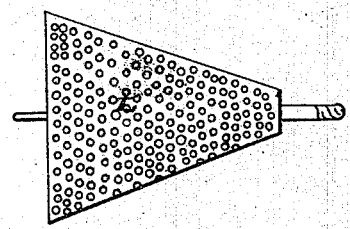
Figure 3 represents a side view of my grater removed from the machine.

It consists of a conical case, A, fig. 1, supported at its vertex by the standard B, and at its base by two braces, one of which is shown at $c$, the plane of its base forming an angle of about forty-five degrees with the standard B. D, fig. 1, is a hopper opening into the casing. Inside of this casing is a conical cylinder, E, figs. 1 and 2, having at its apex a shaft, as shown at $f$, fig. 1, which, passing through the vertex of the casing, has its bearing in the brace $g$. The base of the cone, by means of a pivot, $h$, fig. 2, has its bearing in a yoke, $k$, fig. 1, passing across the base of the casing A. The shaft $f$ has upon it a movable gear, $m$, which making a bevelled gear with $n$, the whole is set in motion by the crank $o$, the shaft $h$ being at right angles to the standard B and the brace $g$, in which it has its bearings. Around the cone E are arranged longitudinally four or more knives, $p\ p'$, fig. 1, and $p\ p'\ p''\ p'''$, fig. 2, extending from base to vertex, and graduated in width to correspond to the shape of the cone. Around the base of the cone E is placed a movable rim, R, fig. 2, having four or more eccentric slots, $s\ s'\ s''\ s'''$, fig. 2, and the same number of regular slots $t\ t'\ t''\ t'''$, fig. 2, $t'$ and $t'''$ being made to receive projections of the cone, and $t$ and $t''$ receiving the screws which keep the rim in position, while eccentric slots $s\ s'\ s''\ s'''$ receive projections from the knives. By loosening the screws at $t\ t''$, and turning the rim, the knives may be adjusted as desired, the extent of the same being limited by the angle of the eccentric slots and guided by the regular slots $t'$ and $t'''$, and when adjusted the screws will be tightened. By means of a vise, V, fig. 1, the machine may be attached to a table if desired. The vegetables being placed in the hopper D, and the knives set in motion, the slices, as they are cut from the vegetables, will fall out of the inner cone in the direction indicated by the arrow, into the vessel placed to receive them. If it be desired to mash the vegetables, the cone E, by removing the nut W, fig. 1, and the yoke K, may be taken from the casing, and the conical cylinder L, fig. 3, which is so perforated as to present a rough grating surface throughout, may be substituted, it being kept in position in the same manner as was the cone E. By the action of this upon the vegetables, placed as before in the hopper, they will be ground as fine as desired.

The advantages of my invention consist in having the knives adjustable so as to regulate the thickness of the slices; in having a conical form, which causes the vegetables to be well mixed when different kinds are sliced at once, since falling from the knife they do not at once drop into the receiving vessel, but will make one or more revolutions before falling from the knife-cylinder. Another advantage is the ease with which the same machine is turned into a grater by substituting the one cylinder for the other. This grater may be used as well with nutmegs, lemons, cocoa-nuts, and the like, as with vegetables merely. Its being easily attached to a table and as easily removed, is another of its points of superiority.

I do not claim to be the first inventor of the method of slicing vegetables by means of knives made to revolve upon a cylinder, or of the device of attaching such a machine to a table by means of a vise, nor of grating vegetables by a revolving grater; but what I do claim as my invention, and desire to secure by Letters Patent, is—

The outside conical cylinder A, the revolving conical cylinder E, the adjustable knives $p\ p'\ p''\ p'''$, the movable rim R, with its eccentric and regular slots, the grating-cone L and the vise V, all in combination when constructed and arranged substantially as shown and described.

T. G. HÖFER.

Witnesses:
SAM'L S. BOYD,
HENRY T. CARTER.